United States Patent [19]

Shimamura

[11] 4,143,322

[45] Mar. 6, 1979

[54] CARRIER WAVE RECOVERY SYSTEM APPARATUS USING SYNCHRONOUS DETECTION

[75] Inventor: Tadao Shimamura, Tokyo, Japan

[73] Assignee: Nippon Electric Co., Ltd., Tokyo, Japan

[21] Appl. No.: 838,173

[22] Filed: Sep. 30, 1977

[30] Foreign Application Priority Data

Sep. 30, 1976 [JP] Japan .................................. 51-118159

[51] Int. Cl.² .......................... H04B 1/16; H03D 3/02
[52] U.S. Cl. ..................................... 325/320; 325/420;
325/346; 329/124; 329/112
[58] Field of Search ................. 325/30, 320, 345, 346,
325/349, 419, 420, 423; 178/66 R, 66 A, 67, 88;
329/110, 112, 122, 124, 125; 331/9, 12, 64

[56] References Cited

U.S. PATENT DOCUMENTS

| 4,085,378 | 4/1978 | Ryan et al. | 329/124 |
| 4,092,606 | 5/1978 | Lovelace | 329/124 |

*Primary Examiner*—John C. Martin
*Attorney, Agent, or Firm*—Sughrue, Rothwell, Mion, Zinn and Macpeak

[57] ABSTRACT

A carrier wave recovery apparatus of the decision feedback type having analog multipliers of lower dynamic range. The modulated signal is phase detected by comparison with a VCO signal. The analog multipliers receive a signal derived by subtraction of the phase detected signal from the same phase detected signal compared with a reference. That signal is multiplied in an analog multiplier by the phase detected signal or by the signal produced from comparing the phase detected signal with a reference.

8 Claims, 18 Drawing Figures

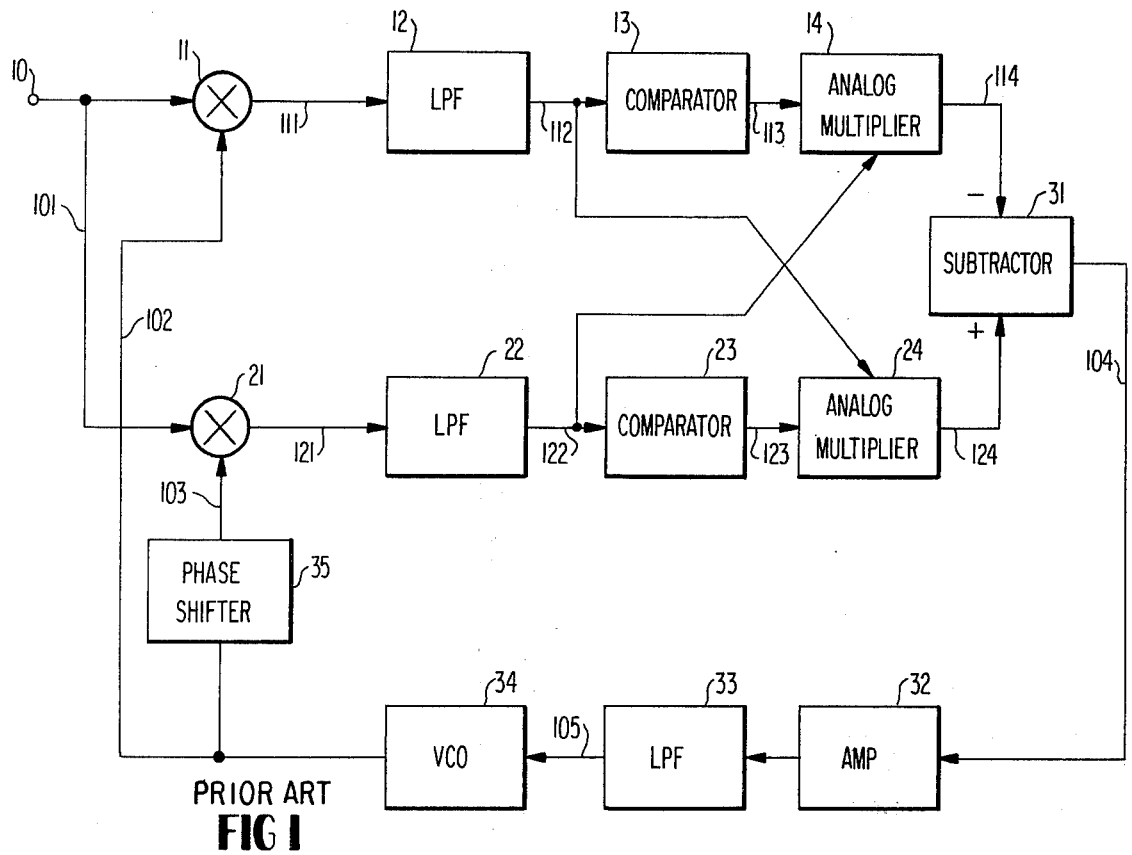
PRIOR ART
FIG 1
FIG 2(a)
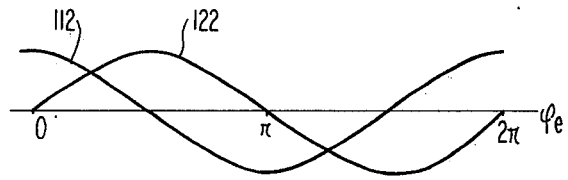
FIG 2(b)
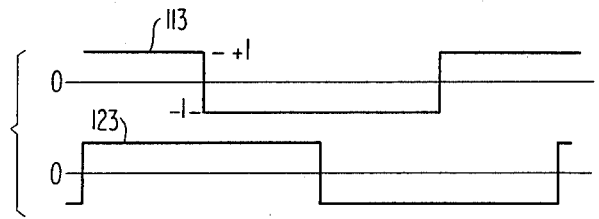
FIG 2(c)
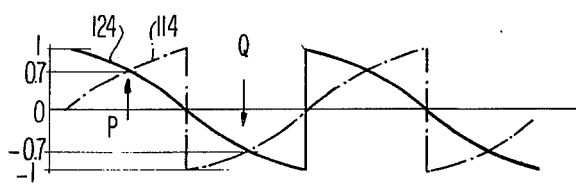
FIG 2(d)
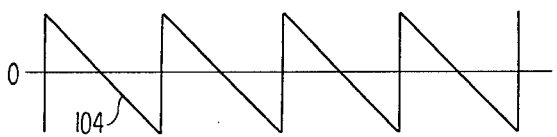

CARRIER WAVE RECOVERY SYSTEM APPARATUS USING SYNCHRONOUS DETECTION

BACKGROUND OF THE INVENTION

This invention relates to a carrier wave recovery apparatus for deriving a reference carrier wave in a demodulator adapted to demodulate a PSK modulated wave based on synchronous detection.

Various proposals have been made for the carrier wave recovery apparatus for restoring a carrier wave from a carrier-suppressed input modulated-wave. Among those proposals, the approach based on signal-processing in the base band region is advantageous over others based on signal-processing in the carrier wave region, in that the circuit for the signal processing is easy to design in a relatively low frequency range, and that the restored carrier wave can be automatically brought to an optimum phase. The carrier wave recovery system of the base band processing type is known as a decision feedback system. This system is introduced in the article entitled "Phase-Locked-Loop Detection of Binary PSK Signals Utilizing Decision Feedback" by F. C. Natali and W. J. Walbesser, published in "IEEE Transactions on Aerospace and Electronic Systems" (Vol. AES-5, No. 1, January 1979, PP. 83-90). An example of this system is disclosed in the article entitled "Mirowave QPSK Demodulator Techniques at the Receiver Front End" by C. L. Cuccia, published in pp. 40-42 of "1977 IEE-MTT-S INTERNATIONAL MICROWAVE SYMPOSIUM". According to the circuit disclosed in FIG. 2 in the latter article, the output of a voltage controlled oscillator (VCO) serving as a carrier wave source is supplied directly and through a 90% phase shifter respectively to first and second phase detectors as reference carrier waves for synchronous detection of an input modulated-wave; then the input modulated wave is coherently detected; these coherently detected outputs are applied to first and second comparators for determining the polarity of the output voltages of the first and second phase detectors and providing a predetermined output voltage of the detected polarity or the polarity opposed to the detected one; the product of the second (or first) coherently detected output and the second (or first) comparator output is multiplied in a first (or second) analog multiplier; then the difference output between the first and second analog multiplier outputs is derived from a subtractor; and the VCO is controlled by a voltage representing the above difference for deriving a reference carrier wave.

However, this prior art circuit requires a broader dynamic range for the multipliers, since the output voltage level of two multipliers for bringing VCO input to 0 volt is high. The multipliers of a wide output voltage range are complicated in construction and costly to manufacture.

SUMMARY OF THE INVENTION

It is therefore an object of the present invention to provide a carrier wave recovery apparatus in which such analog multipliers of broad dynamic range can be dispensed with in which a desirable phase comparison characteristic is stable enough to enable even a further simplified multiplier to derive the carrier wave satisfactorily.

According to the present invention, there is provided a carrier wave recovery apparatus which comprises: an input terminal for receiving a modulated carrier wave; a voltage controlled oscillator forming a carrier wave source; first and second phase detectors supplied with the outputs of said voltage controlled oscillator directly and through a 90° phase shifter, respectively, and with said modulated wave in parallel, for demodulating said modulated wave; first and second comparators adapted to determine the polarity of the output voltages of the first and second phase detectors with respect to a reference voltage and to provide a predetermined output voltage of the detected polarity; a first substractor for providing a first difference voltage representative of the difference between the outputs of the first phase detector and the first comparator; a second subtractor for providing a second difference voltage representative of the difference between the outputs of the second phase detector and the second comparator; a first analog multiplier for providing the product of the outputs of the first subtractor and the second comparator (or the output of the second phase detector); a second analog multiplier for providing the product of the outputs of the second subtractor and the first comparator (or the output signal of the first phase detector); a third subtractor for providing the difference between the outputs of the first and the second multipliers; and means for supplying the output of the third subtractor to the voltage controlled oscillator as phase control signal.

BRIEF DESCRIPTION OF THE DRAWINGS

FIG. 1 is a block diagram of a prior art carrier wave recovery apparatus;

FIGS. 2(a)-2(d) are waveform diagrams for illustrating the operation of the apparatus of FIG. 1;

DESCRIPTION OF THE PREFERRED EMBODIMENTS

Figure 3:
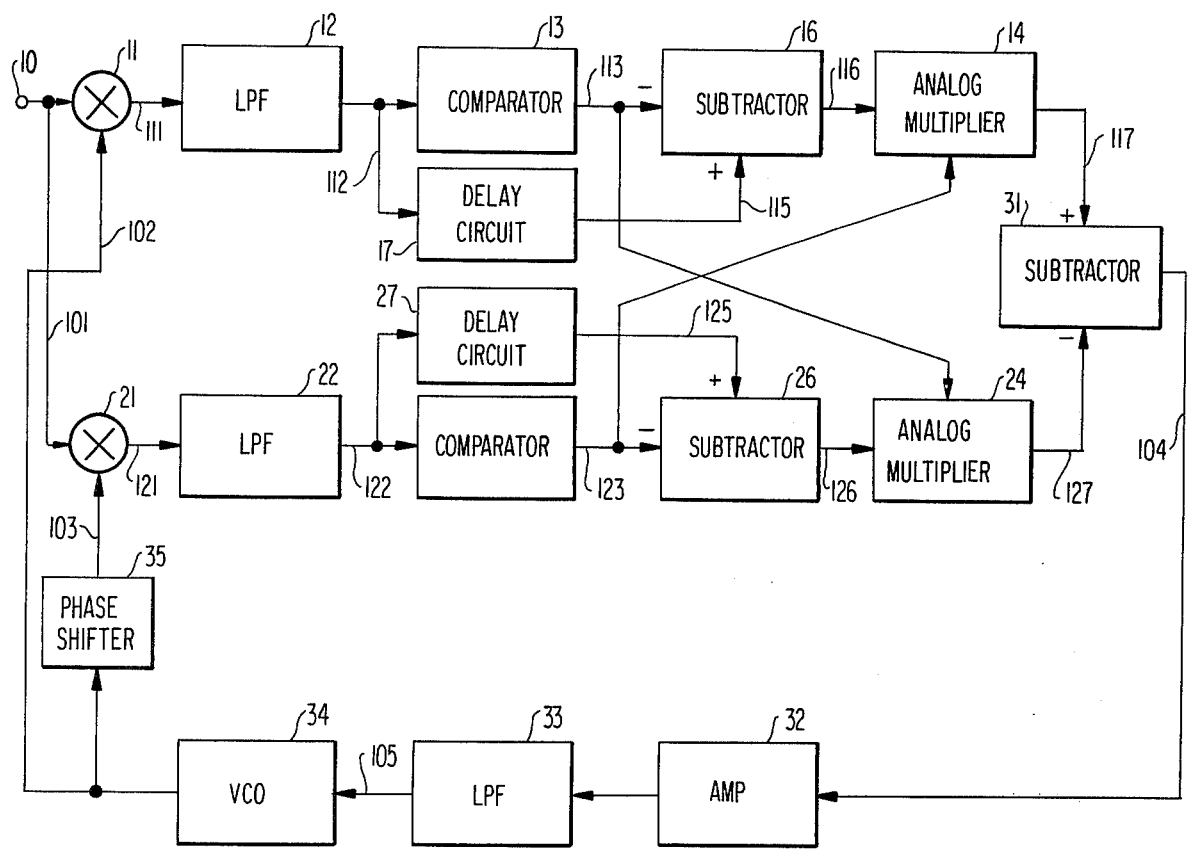
FIG. 3 is a block diagram of the first embodiment of the invention.

In FIG. 1 showing in blocks an arrangement of a conventional carrier wave recovery apparatus using the aforesaid 'Decision Feedback', reference numeral 34 denotes a voltage controlled oscillator (VCO) serving as a carrier wave source. The input modulated wave supplied from an input terminal 10 is supplied to multipliers 11 and 21, to which the output of VCO 34 is also supplied directly and through a 90° phase shifter 35, respectively. Low frequency components of the multipliers 11 and 21 are derived by low pass filters 12 and 22. The multiplier 11, filter 12, and the multiplier 21, filter 22 operate as phase detectors, respectively. These low frequency signals are compared with a given threshold voltage (for instance, 0 volt) at comparators 13 and 23 to provide +1 or −1 polarity-representing output. The output signals of the comparator 13 and filter 22 are supplied to analog multiplier 14, while those of the comparator 23 and filter 12 to another multiplier 24, for obtaining respective products. The outputs of these analog multipliers 14 and 24 are supplied to a subtractor 31 for obtaining a difference voltage. The output of the subtractor 31 is amplified by a d.c. amplifier 32, and then supplied through a low pass filter 33 to the VCO 34 for the phase control. In this manner, VCO 34 reproduces a carrier wave in response to an input modulated wave.

Referring now to FIGS. 2(a)–2(d) showing waveform diagram illustrative of the operation of the conventional system of FIG. 1, the phase difference $\varphi_e$ between an input signal and a VCO output signal in the case of non-modulated wave is represented by the abscissa, while output voltages in respective portions are represented by the ordinate. More particularly, respective reference carrier wave input signals 102 and 103 applied to multipliers 11 and 21 provide a phase difference of $\pi/2$ radian (90°). As shown at FIG. 2(a), assume that the output signal 112 of the first phase detector consisting of the multiplier 11 and the low pass filter 12 varies in a cosine pattern in response to the phase difference $\varphi_e$, then the output signal 122 of the second phase detector consisting of the multiplier 21 and the low pass filter 22 varies in a sine pattern. Description will be given with reference also to the path of the signals shown in FIG. 1, in which the like reference numerals are given at wirings for corresponding waveforms. The signals 112 and 122 are turned into rectangular signals 113 and 123 at the comparators 13 and 23 as shown at FIG. 2(b). Referring also to FIG. 2(c), the output signal 114 of the multiplier 14 is the product of the signals 113 and 122, while the output signal 124 of the multiplier 24 is the product of the signals 123 and 112. The output signal 104 of the subtractor 31 represents the difference between the signals 114 and 124 as shown at FIG. 2(d). It will be seen that the signal 104 is a saw-tooth shaped wave having a fixed angular interval of $2\pi/4$ radian. For each angular interval, the voltage of the signal 104 exhibits a linear change with respect to the change in the phase difference $\varphi_e$. This signal 104 is supplied through the d.c. amplifier 32 and the filter 33 to the VCO 34 for controlling the output phase of the VCO. The above-mentioned voltage vs. phase difference change with the fixed interval of $2\pi/4$ serves to provide a phase lock loop for a four-phase phase modulated wave.

Reference is made to those operating voltage levels P and Q of the signals 114 and 124 where the phase difference signal 104 is zero. It will be seen that the operating voltage levels are maintained at about 0.7 in relative scale (corresponding to cos 45° ). In a phase lock loop, linearity and stability for near-zero-level of the circuits handling the signal 104 are of primary importance. To meet these requirements, the dynamic ranges of the multipliers 14 and 24 must be wide enough to provide a desirable linearity and stability in the neighbourhood of the points P and Q in FIG. 2(c). However, an analog multiplier tend to be extremely complicated in construction, when its dynamic range is to be broadend.

Referring to FIG. 3, showing a first embodiment of the invention, like reference numerals are given to like structural elements shown in FIG. 1. The embodiment differs from the conventional system of FIG. 1 in that subtractors 16 and 26, and delay circuits 17 and 27 are added. The subtractors 16 and 26 serve to respectively subtract the comparator outputs 113 and 123 from the phase detector outputs 112 and 122 supplied respectively through delay circuits 17 and 27. The delay circuits 17 and 27 compensate for delay introduced at the comparators 13 and 23. These delay circuits 17 and 27 may be dispensed with when the delay is negligible. The output signal 116 of the subtractor 16 and the output 123 of the comparator 23 are fed to the analog multiplier 14 for multiplication, while the output signal 126 of the subtractor 26 and the output signal 113 of the comparator 13 are fed to the analog multiplier 24 for multiplication, after which a difference signal between the output signals 117 and 127 is derived as the phase difference signal 104. Referring also to FIGS. 4(a)–4(e), the waveform of the signal 104 is similar to that of the arrangement of FIG. 1. As is clearly seen in FIG. 4(d), the operating voltage level of the analog multiplier 14 and 24 is in the range of about 0.3 in relative scale compared with the conventional system of FIG. 1. Therefore, the dynamic range of the multipliers 14 and 24 can be reduced to 3/7. The analog multipliers are therefore less complicated and less costly to manufacture.

Figure 5:
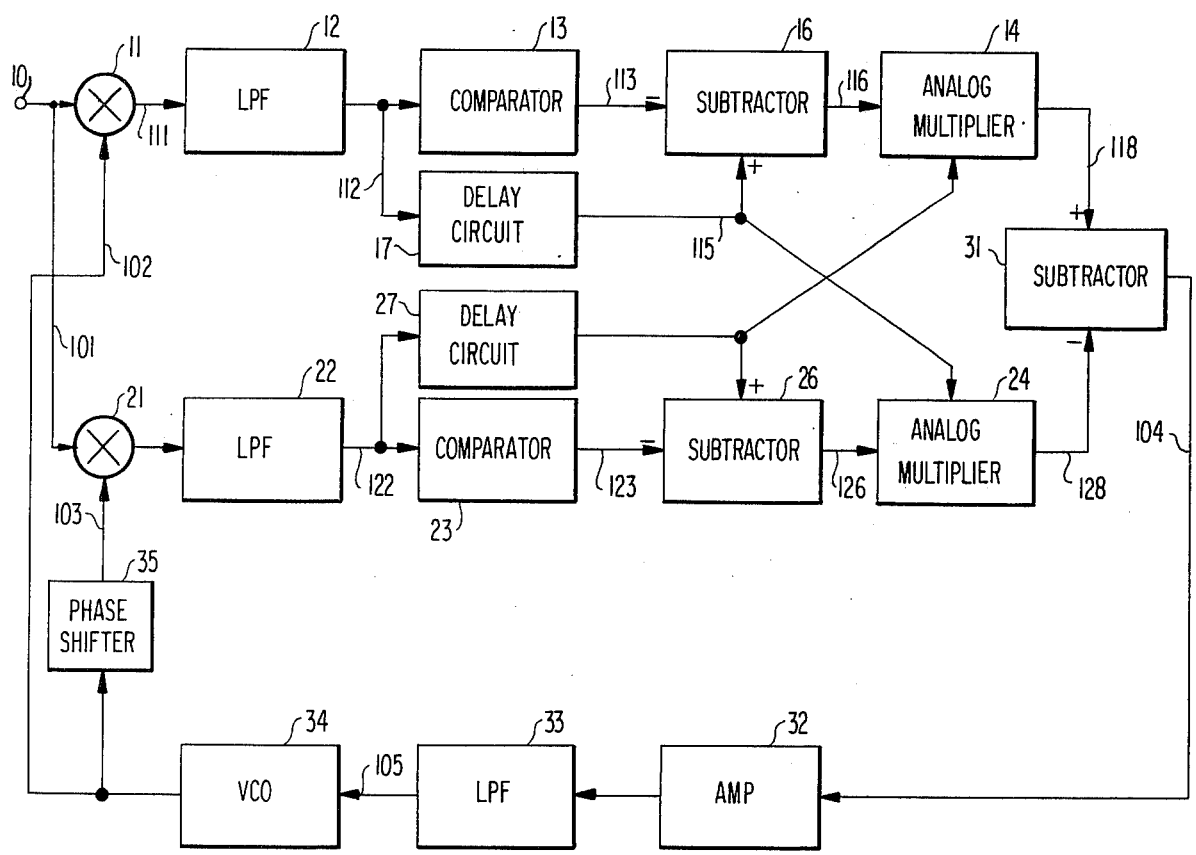
FIG. 5 is a block diagram of the second embodiment of the invention.
Figure 6A:
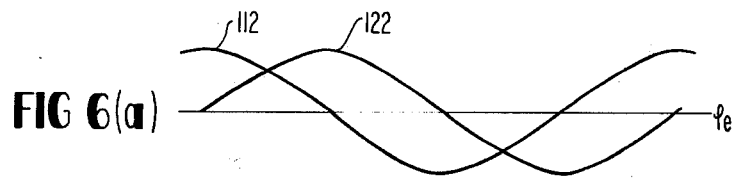
FIGS. 6(a)-6(e) are waveform diagrams illustrative of the operation of the embodiment of FIG. 5.
Figure 6B:
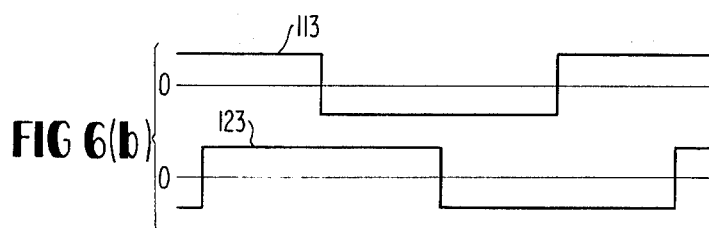
Figure 6C:
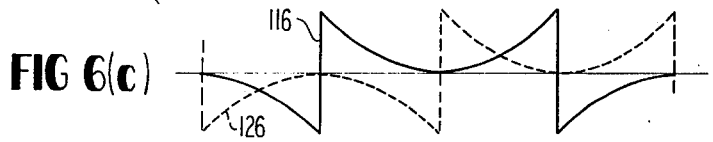
Figure 6D:
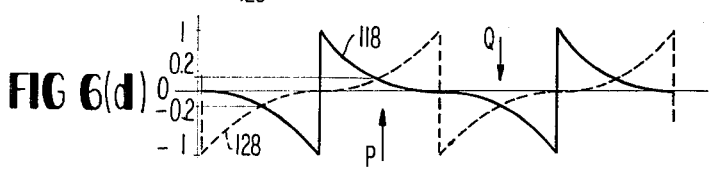
Figure 6E:
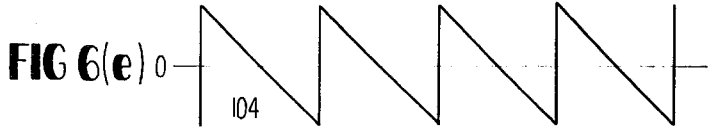

Referring to FIG. 5, showing a second embodiment of the invention, like reference numerals denote like structural elements. The second embodiment differs from the first embodiment in that the analog multiplier 14 provides the product of the difference signal 116 and the second phase detector output 125; and that the analog multiplier 24 provides the product of the difference signal 126 and the first phase detector output 115. In this embodiment, the phase difference signal 104 is derived by subtracting the output 128 from the output 118 of the multiplier 14.

Figure 4A:
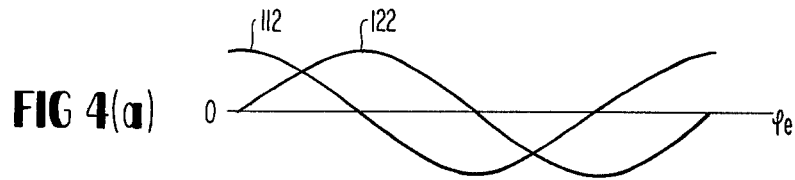
FIGS. 4(a)-4(e) are waveform diagrams illustrative of the operation of the embodiment of FIG. 3.
Figure 4B:
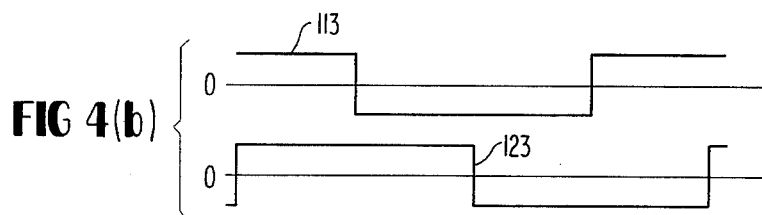
Figure 4C:
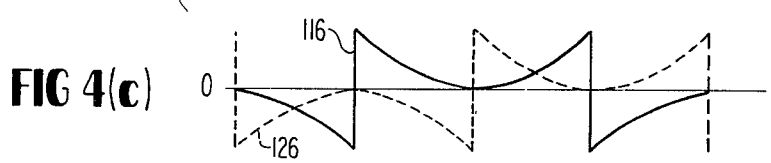
Figure 4D:
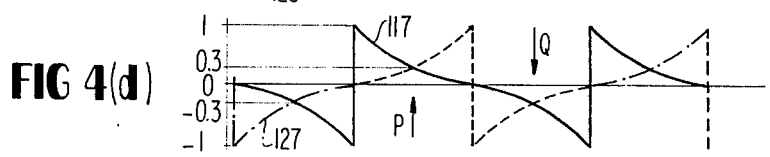
Figure 4E:
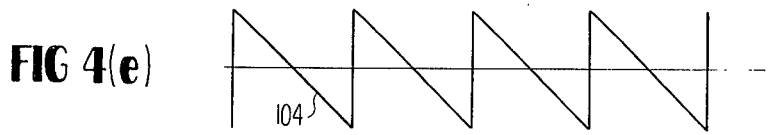

Referring to FIGS. 6(a)–6(e), showing waveforms for describing the operation of the second embodiment, the phase difference signal 104 is almost the same as that of FIG. 4(e). Reference is made to the points P and Q for output signals 118 and 128 of the analog multipliers 14 and 24. These points, where the phase difference signal 104 is zero are about 0.2 in relative scale. As is seen from FIG. 6(d), the dynamic range needed for the analog multipliers 14 and 24 is as low as 2/7 of that for the conventional system of FIG. 1.

Figure 7:
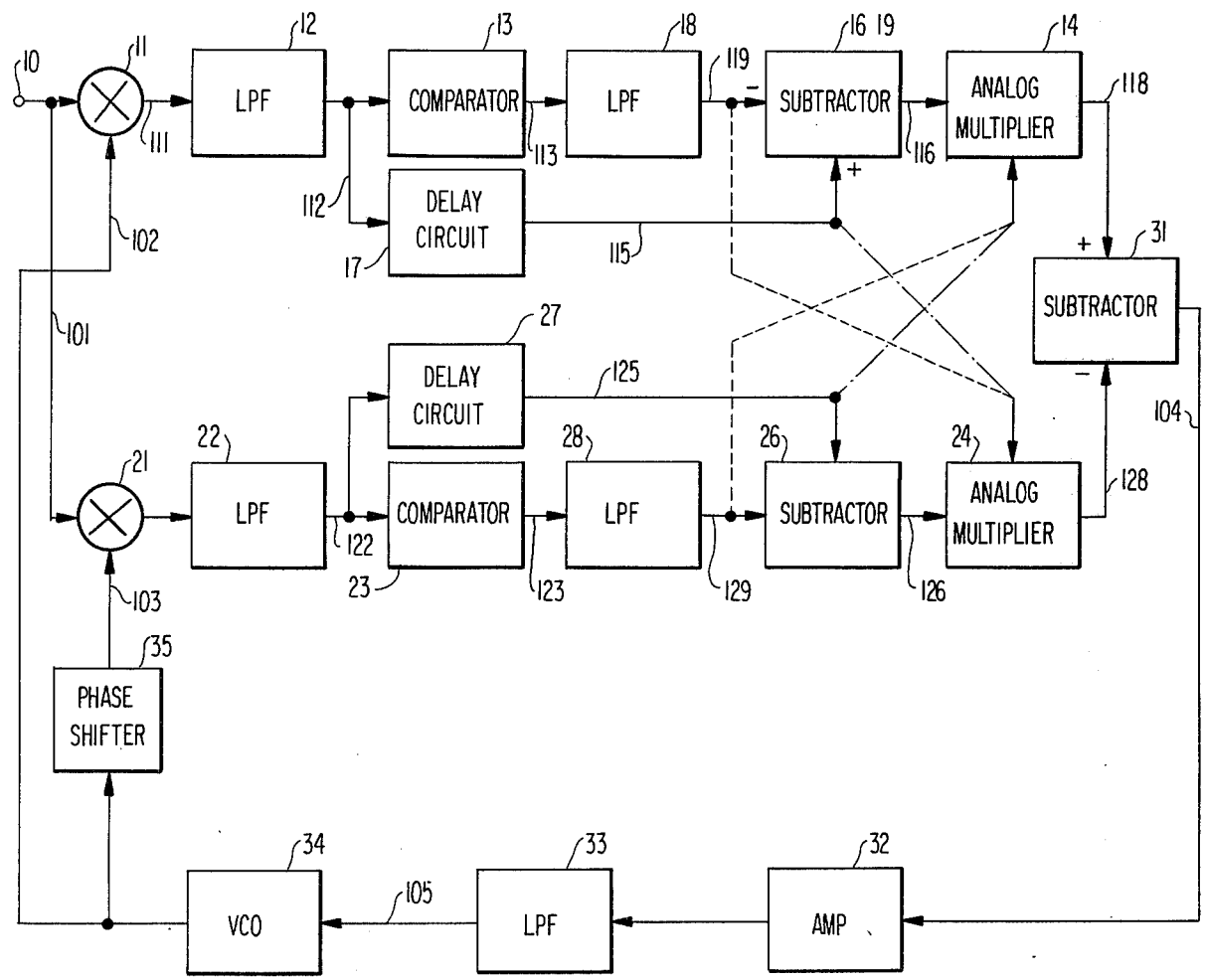
FIG. 7 is a block diagram of the third embodiment of the invention.

Referring to FIG. 7 showing a third embodiment of the present invention, low pass filters 18 and 28 are added to the preceding embodiments, so that the output signals 113 and 123 of the comparators 13 and 23 may be supplied therethrough to the subtractors 16 and 26. In this case, the transmission characteristics of the low pass filters 18 and 28 are set to be equivalent to that of the transmission path. Broken lines in FIG. 7 correspond to those of the first embodiment, while the arrangement shown by dot-dash lines corresponds to the second embodiment of the invention. These filters 18 and 28 contribute to minimize the phase fluctuation in the restored carrier wave, which tends to be associated with the change in the input signal voltage due to the limited frequency band for transmission.

As has been described above, in the carrier wave recovery system of the invention, the linearlity and stability of the phase difference signal extraction for the carrier recovery are ensured with analog multipliers of narrower dynamic range. Thus, the present invention makes it possible to reduce the cost for manufacturing a demodulator for PSK modulated waves.

What is claimed is:

1. A carrier wave recovery apparatus comprising: an input terminal for receiving a carrier-suppressed modulated signal; a voltage controlled oscillator forming a source of a carrier wave for demodulation of said modulated signal; first and second phase detector means supplied with the output of said voltage controlled oscillator directly and through a 90° phase shifter, respectively, for demodulating said modulated signal; first and second comparator means for determining the polarity of the output voltages of said first and second phase detector means with respect to a reference voltage and for providing a predetermined output voltage of a polarity depending on the determined polarity; a first subtractor for providing the difference between the outputs of said first phase detector and said first comparator; a second subtractor means for providing the difference between the output of said second phase detector and said second comparator; a first analog multiplier means for multiplying the outputs of said first subtractor and said second comparator; a second analog multiplier means for multiplying the outputs of said second subtractor and said first comparator; a third subtractor means for providing the difference between the outputs of said first and said second multipliers; and means for supplying the output of said third subtractor to said voltage controlled oscillator for phase control.

2. A carrier wave recovery apparatus as claimed in claim 1 further comprising first and second low pass filter means interposed between said first phase detector and said first comparator, and between said second phase detector and said second comparator.

3. A carrier wave recovery apparatus as claimed in claim 1 further comprising first delay means, connected between said first phase detector and said first subtractor for imparting a delay corresponding to the delay caused by said first comparator, and second delay means, connected between said second phase detector and said second subtractor for imparting a delay corresponding to the delay caused by said second comparator.

4. A carrier wave recovery apparatus as claimed in claim 1 further comprising a first low pass filter connected between said first comparator and said first subtractor, and a second low pass filter connected between said second comparator and said second subtractor.

5. A carrier wave recovery apparatus comprising: an input terminal for receiving a carrier-suppressed modulated signal; a voltage controlled oscillator forming a source of a carrier wave for demodulation of said modulated signal; first and second phase detector means supplied with the output of said voltage controlled oscillator directly and through a 90° phase shifter, respectively, for demodulating said modulated signal; first and second comparator means for determining the polarity of the output voltages of said first and second phase detector means with respect to a reference voltage and for providing a predetermined output voltage of a polarity depending on the determined polarity; a first subtractor means for providing the difference between the outputs of said first phase detector and said first comparator; a second subtractor means for providing the difference between the output of said second phase detector and said second comparator; a first analog multiplier means for multiplying the outputs of said first subtractor and said second phase detector; a second analog multiplier means for multiplying the outputs of said second subtractor and said first phase detector; a third subtractor means for providing the difference between the outputs of said first and said second multipliers; and means for supplying the output of said third subtractor to said voltage controlled oscillator for phase control.

6. A carrier wave recovery apparatus as claimed in claim 5 further comprising first and second low pass filter means interposed between said first phase detector and said first comparator, and between said second phase detector and said second comparator.

7. A carrier wave recovery apparatus as claimed in claim 5 further comprising first delay means, connected between said first phase detector and said first subtractor for imparting a delay corresponding to the delay caused by said first comparator, and second delay means, connected between said second phase detector and said second subtractor for imparting a delay corresponding to the delay caused by said second comparator.

8. A carrier wave recovery apparatus as claimed in claim 5 further comprising a first low pass filter connected between said first comparator and said first subtractor, and a second low pass filter connected between said second comparator and said second subtractor.

* * * * *